Sept. 5, 1944.     H. L. BROWNBACK     2,357,578
BEARING
Filed Nov. 15, 1940
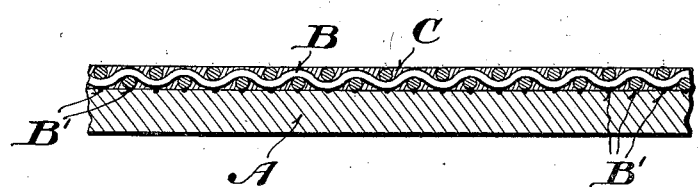
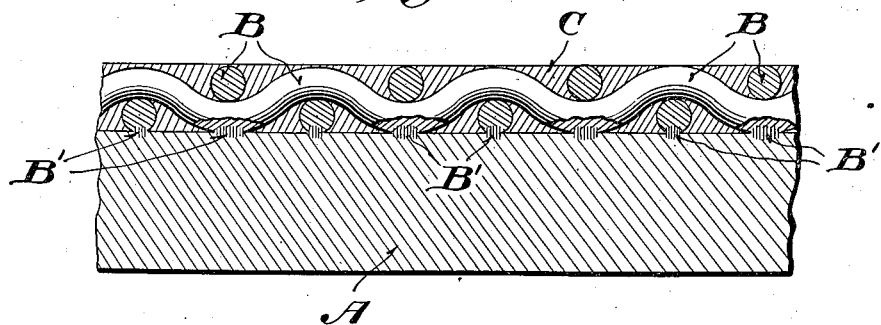

Patented Sept. 5, 1944

2,357,578

UNITED STATES PATENT OFFICE 2,357,578

BEARING

Henry Lowe Brownback, Norristown, Pa.

Application November 15, 1940, Serial No. 365,840

10 Claims. (Cl. 308—237)

This invention relates to bearings such as used in internal combustion engines, and the principal object thereof is to provide a bearing which may readily be made in strip form so that it can be subsequently shaped into shells of cylindrical or semi-cylindrical form or in washer form, said bearing or bearing strip comprising a strong metallic backing having bonded thereto a preformed screen, grid or reticular matrix of a metal having a lower melting point than that of the backing, the interstices or openings of said screen, grid or reticular matrix being filled with a filler of bearing metal of good quality, the backing giving requisite rigidity to the bearing and supporting the screen, grid, or reticular matrix which carries and holds in place the relatively weak bearing metallic filler which is bonded to the screen, grid or matrix, or to the backing, or to both. The bearing metal or filler will ordinarily form the main bearing surface although the screen, grid or reticular matrix itself may be preformed of a metal having inherently good bearing qualities, or such qualities that when combined with the softer bearing metal will provide good bearing surface.

Other objects of the invention are to provide a bearing of the above type in which the strong backing may be formed of steel, and may have bonded to one or both sides thereof a copper screen, grid or reticular matrix having a lead filler; or may comprise a steel or aluminum backing having bonded thereto a silver screen, grid or reticular matrix having a lead or cadmium filler; or may comprise an aluminum alloy backing having bonded thereto an aluminum screen, grid or reticular matrix having a tin filler; or may comprise a steel or bronze backing having bonded thereto a bronze screen, grid or matrix having a babbitt filler.

Another object of my invention is to provide a bearing of the above type having a rigid metallic backing to which a pre-formed screen, grid or reticular matrix of strong metal having good bearing characteristics is directly bonded, soldered or brazed, the interstices of the screen, grid or matrix being filled with oil, grease, graphite or a bearing plastic.

Further objects of my invention are to provide a method of producing bearings of the above type in which the bonding of the pre-formed screen, grid or reticular matrix is effected by heating the metallic backing within a controlled non-oxidizing atmosphere to a degree higher than that of the fusion point of the screen, grid or matrix, and then pressing or rolling the backing and screen, grid or matrix together under heat and great pressure while maintained within said controlled atmosphere. The heat stored in the backing, augmented by the heat generated by the molecular re-arrangement in the metals due to intense pressure, will melt the surface of the pre-formed screen, grid or reticular matrix for a depth of several molecules and at the same time press this molten surface into the surface of the heated backing the molecules of which have been opened due to the heating. Molecular penetration will thus result and bonding will take place before a general melting of the screen, grid or matrix can take place which would change the form thereof, the metals being subsequently cooled to prevent further melting of the screen, grid or matrix.

Several types of present day bearings are made of copper-lead compositions, babbitt covered lead bronze, lead covered silver, and various aluminum alloys. Except for this latter the various metals are usually bonded to a steel back to give strength to the bearing metals. The copper-leads are applied in various manners the principal ones being the pouring of molten copper-lead mixtures into heated steel shells, effecting a bonding of the copper to the steel, the mixture on cooling forming a copper matrix through which the lead is distributed. The bearing surface is composed of both the copper matrix and the lead filling. When forming copper-lead bearings, if lead is poured into the steel shell in its pure form, such lead is not the best type of lead for mechanical resistance or bearing qualities, and same is subject to corrosion by acids developed in the lubricants during operation of an engine. Any attempt to alloy the lead results in some of the alloying material entering into the copper to form an alloy which has undesirable bearing qualities. Further it is very difficult to get an even distribution of lead through the mass of the copper so that the bond is free of lead and no gas holes or lead aggregations will be formed throughout the mass of copper-lead.

When silver bearings are used, the silver is bonded to a steel back and is covered with lead; or else a groove is cut in the silver and either lead or cadmium placed in this groove. In bearings of silver or copper-lead covered with a softer bearing metal, the latter must be very thin, and thus it can easily wear through thereby destroying its effectiveness; while in the type having a lead or cadmium filled groove, the filling is subject to the same bond weakness of an ordinary Babbitt or cadmium bearing.

Another type of copper-lead, or lead-bronze bearing is formed by placing the constituents of the bearing metals in powdered form on a backing and passing the plate or strip so covered through a furnace having a controlled atmosphere, until the copper bonds and the lead melts through the mixture impregnating the copper or bronze sponge formed in the process.

A still further type of bearing now in use is formed by placing powdered copper or copper alloy on a steel plate or strip, and sintering this powdered copper or alloy to the steel thus forming a bonded copper sponge matrix on the steel back; and then this matrix is impregnated and/or coated with babbitt or lead alloy. This sintering method has several drawbacks. The copper which must bond to the steel and at the same time form a sponge or matrix must be sufficiently heated to permit the said bonding and joining of the grains without melting to a liquid, an operation which is very delicate; and when completed the matrix which is to be impregnated is not necessarily uniform since not all of the openings in the matrix into which the lead or other bearing metal must penetrate are open to the flow of such metal, and only those near the surface of the matrix may be impregnated while those adjacent the backing and at the middle of the matrix thickness may be void, thereby weakening same. Thus in this sintered type of bearing all of the hollows of the sintered sponge are not open to the surface and cannot be filled with bearing metal; and when the surface is machined and the sponge theoretically exposed, all parts of the sponge are not in fact filled with the softer metal, but parts of the sponge are simply void.

My invention, however, utilizing a pre-formed screen, grid or reticular matrix bonded directly to the backing, differs from the use of above mentioned sintered sponge since the openings or reticulations of the screen, grid or matrix are all open at the surface, and therefore thorough impregnation of the filler is certain; and thus the volumes or ratios of screen metal and bearing metal can be accurately determined so that a pre-calculated balance may be maintained.

I will explain the invention with reference to the accompanying drawing which illustrates one practical embodiment thereof to enable others to adopt and use the same, and will summarize in the claims the essential features of the invention for which protection is desired.

In said drawing:

Fig. 1 is a section showing a pre-formed screen, grid or reticular matrix bonded to a backing.

Fig. 2 is an enlarged section showing the bonded screen impregnated with a soft bearing metal or filler, which filler is bonded to the screen, or to the backing, or to both.

According to my invention the bearing consists of a strong rigid backing A of metal, such as steel, aluminum, aluminum alloy or the like, having a pre-formed screen, grid or reticular matrix B formed of copper, copper alloy, bronze, silver, silver alloy, aluminum, aluminum alloy, or other metal preferably having good bearing quality bonded thereto, said screen, grid or matrix B being impregnated with a filler C of softer bearing metal, which filler C may be bonded to the screen, grid or matrix B, or to the back A, or to both. The screen, grid or reticular matrix B is of such form that the relative amounts of both metals B and C can be controlled, and the size and form of the openings therein is such that every opening extends to the outer surface of matrix B, so that the impregnating metal C may enter into every opening and may be placed under great pressure by rolling the heated metals together under high pressure. The softer bearing metal or filler C may be of tin, lead, lead alloy, babbitt, cadmium, cadmium alloy, or the like, and, if desired, is of such thickness as to leave a coating of metal over the outer surface of the screen, grid, or matrix B.

In certain types of bearings where self-lubrication or long-time lubrication is desired, the soft bearing metal C may be omitted and the matrix B impregnated with oil, graphite, grease or bearing plastic, the screen, grid, or matrix B being formed of metal having good bearing qualities, constituting the contact surface of the bearing.

The bonding of the screen, grid or matrix B to the backing A may be accomplished in one of several ways. Backing A may be in the form of a metal tray, strip, cylinder, or the like, which may be placed in a furnace, preferably having a controlled reducing or non-oxidizing atmosphere, or a fluxed atmosphere, and heated until it reaches a temperature higher than the melting point of the metal of the screen, grid or reticular matrix B which is to be bonded thereto. Then the pre-formed screen, grid or matrix is placed thereto, at either or both sides of backing A, and the assembled backing and screen (or screens) are passed into a press where the screen, grid or matrix B is brought into intimate contact at great pressure with the backing A, thereby bonding the screen to the backing. The heat stored in backing A, plus the heat generated by the molecular re-arrangement in the metals due to intense pressure, will melt the surface of screen, grid or matrix B for a depth of several molecules and, at the same time, press this molten surface at points B' (Fig. 2) into the surface of the heated backing A, the molecules of the backing having been opened by said heating. Thus a molecular penetration will result, but before the melting has progressed more than an infinitely small depth the united parts are passed through a chill to prevent further melting of screen B.

A second method is to apply the screen, grid or matrix B in strip or other desired form to a backing A in strip or other desired form, and pass both into a furnace, preferably having a controlled reducing or non-oxidizing atmosphere, and heat them until bonding as above described may occur without melting the grid or screen. In this method the screen, grid or reticular matrix B of relatively high strength and good bearing qualities is directly bonded to the solid backing A by applying same to the backing and placing the assembly in the furnace and heating it to a temperature above the point of fusion of the softer metal but below that at which the metal of the screen or grid actually becomes fluid. The heat stored in the backing A, augmented by the heat generated by the molecular re-arrangement in the metals due to intense pressure, will melt the surface of the pre-formed screen, grid or matrix B for a depth of several molecules, and when the backing and screen are passed between pressure rolls or the like the pressure will cause this molten surface to penetrate into the surface of the heated backing A, the molecules of which have been opened through heating; and thus molecular penetration will result. Before further melting of the matrix B however can take place such as would change the form thereof, bonding will take place. The metals are cooled to prevent further melting of the screen, grid or matrix.

Instead of passing the backing through a furnace as above described, the same can be heated by passing a current of electricity therethrough, or by induction or the like; also the atmosphere in which the bonding takes place may be produced in many ways, such as by using a volatile flux; also to aid in oxidation and bonding the backing may be plated or coated with the same metal as the material of the screen, grid or matrix prior to processing; also the backing may be coated with a spelter or solder, or the like, to which both the screen and the backing will bond, and the screen applied to the backing in any of the ways above described, heating the coated back until the bonding material is fluid and then pressing or rolling the screen or grid into close contact therewith, or else coating the back or placing a sheet of bonding material on the back and applying the screen to the covered back, and then heating the entire assembly until bonding takes place.

The impregnation of the matrix B may be accomplished by pouring the metal C on the surface thereof, or by placing metal C on the surface and heating same in a furnace, preferably in a controlled atmosphere, until the metal C has penetrated all of the interstices of the matrix B; or by heating the softer metal C until it is sufficiently plastic to bond, and then pressing or rolling same into the openings of the screen B under high pressure; also by any combinations of these methods. The metal C will penetrate every part of the matrix B to the backing A, thus bonding to the matrix B, and/or to the backing A, and interlocking through the openings of the grid, screen or matrix B.

If desired the entire matrix B may be covered with the softer metal C, or the bearing surface may be composed of the softer metal C and the matrix B, or in the case of the matrix impregnated with oil or grease, the bearing surface may consist of the matrix B only.

By proper selection of the size of the wire or metals forming the screen or grid B, and the size of the openings in matrix B, the ratio of matrix metal to softer metals may be determined, and the pre-formed screen or grid will be much stronger than the poured or sintered matrices heretofore used; and will be continuous, and the two metals B and C can be selected and treated to obtain the desired and superior results.

My invention is not limited to the above specific metal combinations, but covers in scope the general principle of providing a rigid backing of metal having bonded to one or both sides thereof a pre-formed screen, grid or reticular matrix having a filler which is bonded to the screen, grid or matrix, or to the backing, or to both, and which may completely cover the surface of the preformed screen, grid or matrix.

I claim:

1. A bearing, comprising a strong rigid metallic backing; a relatively thin strong preformed metallic grid secured throughout its entire area to said backing and having good bearing characteristics, said grid having a lower melting point than that of the backing and having openings therein each extending to the outer surface thereof; and a relatively thin weak filler having a lower melting point than that of the grid and having good bearing characteristics filling the openings in the grid; said grid being secured to the backing by a metal having a higher melting point than the filler.

2. In a bearing as set forth in claim 1, said filler comprising a lubricant.

3. In a bearing as set forth in claim 1, said filler being metallic and covering the outer face of the grid and forming the main bearing surface.

4. In a bearing as set forth in claim 1, said filler being metallic and being flush with the outer surface of the grid, the exposed surfaces of the filler and grid together forming a bearing surface having a controlled ratio of constituent metals.

5. A bearing, comprising a strong rigid metallic backing; a relatively thin strong preformed metallic grid bonded throughout its entire area to said backing and having good bearing characteristics, said grid having a lower melting point than that of the backing and having openings therein each extending to the outer surface thereof; and a relatively thin weak metallic filler having a lower melting point than that of the grid and having good bearing characteristics filling the openings in the grid; the bond between the grid and backing having a higher melting point than the said filler.

6. In a bearing as set forth in claim 5, said filler covering the outer face of the grid and forming the main bearing surface.

7. In a bearing as set forth in claim 1, said filler being flush with the outer surface of the grid, and the exposed surfaces of the filler and grid together forming a bearing surface having a controlled ratio of constituent metals.

8. A bearing, comprising a strong rigid metallic backing; a relatively thin strong preformed metallic grid secured throughout its entire area to said backing and having good bearing characteristics, said grid having a lower melting point than that of the backing and having openings therein each extending to the outer surface thereof; and a relatively thin weak metallic filler having a lower melting point than that of the grid and having good bearing characteristics filling the openings of the grid and bonded to the backing and grid; said grid being welded to the backing by a metal having a higher melting point than the metallic filler.

9. In a bearing as set forth in claim 8, said filler covering the outer face of the grid and forming the main bearing surface.

10. In a bearing as set forth in claim 8, said filler being flush with the outer surface of the grid, and the exposed surfaces of the filler and grid together forming a bearing surface having a controlled ratio of constituent metals.

HENRY LOWE BROWNBACK.